United States Patent [19]

Barnhardt

[11] 4,034,820
[45] July 12, 1977

[54] SUSPENSION SYSTEM FOR A SNOWMOBILE

[75] Inventor: Thomas L. Barnhardt, Menomonee Falls, Wis.

[73] Assignee: Outboard Marine Corporation, Waukegan, Ill.

[21] Appl. No.: 670,054

[22] Filed: Mar. 24, 1976

[51] Int. Cl.² .................................... B62M 27/02
[52] U.S. Cl. ............................... 180/5 R; 267/32
[58] Field of Search ............... 180/5 R; 267/31, 32, 267/18; 244/108

[56] References Cited

U.S. PATENT DOCUMENTS

| | | | |
|---|---|---|---|
| 1,449,703 | 3/1923 | Sprague | 267/32 |
| 3,613,812 | 10/1971 | Hetteen | 180/5 R |
| 3,800,896 | 4/1974 | Albertson | 180/5 R |
| 3,835,947 | 9/1974 | Alexander | 180/5 R |
| 3,867,991 | 2/1975 | Brandli | 180/5 R |
| 3,930,547 | 1/1976 | West | 180/5 R |

Primary Examiner—Richard J. Johnson
Attorney, Agent, or Firm—Michael, Best & Friedrich

[57] ABSTRACT

Disclosed herein is a device for use in a snowmobile suspension system also disclosed herein, which device facilitates increasing the stroke of a shock absorber used in the suspension system. The snowmobile disclosed herein comprises a body having a pair of downwardly extending ski posts, each of which ski posts has associated therewith a suspension system. The suspension system comprises a ski disposed beneath the ski post, together with a leaf spring secured to the ski post for biasing the snowmobile body against substantially downward movement. The suspension system is provided with a shock absorber having a lower end, and having an upper end secured to one of the ski post and the leaf spring, and also includes a device which comprises a bell crank member having a first arm slidably engaging the leaf spring, having a second arm with an end portion secured to the lower end of the shock absorber, and also having a junction portion between the arms, which junction portion is pivotally connected to the ski for pivoting the second arm and displacing the lower end of the shock absorber toward the upper end of the shock absorber in response to a relative movement of the ski post toward the ski.

9 Claims, 4 Drawing Figures

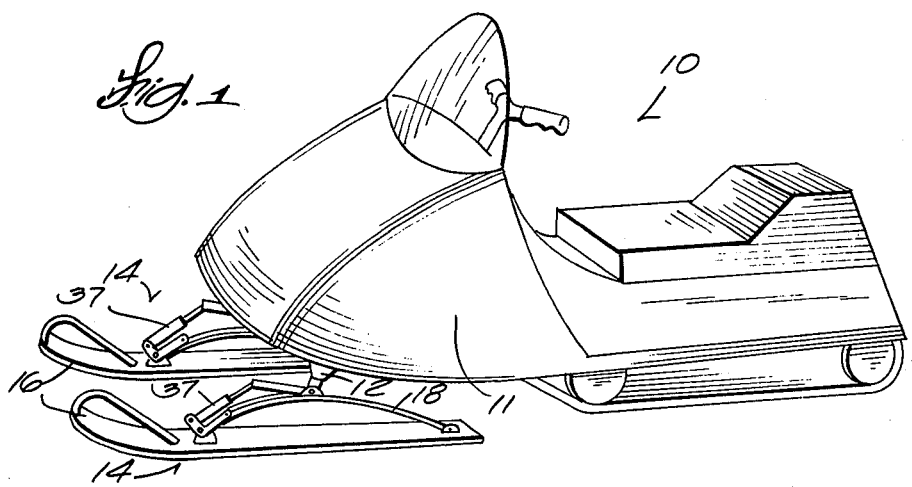
Fig. 1
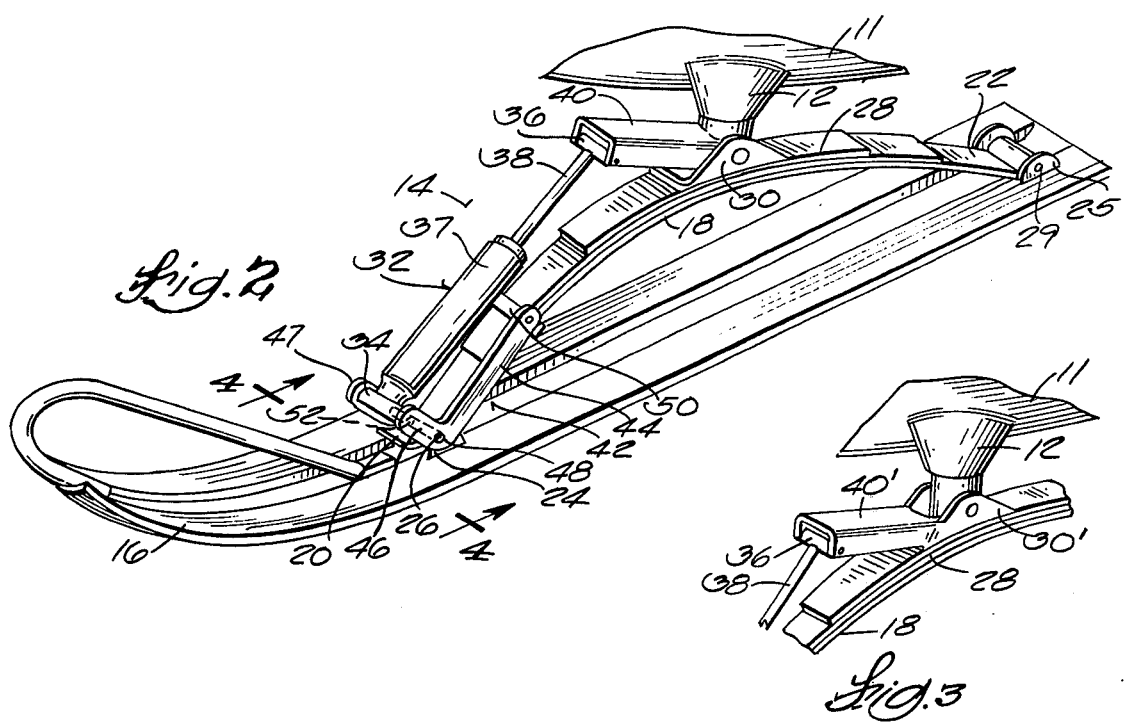
Fig. 2
Fig. 3
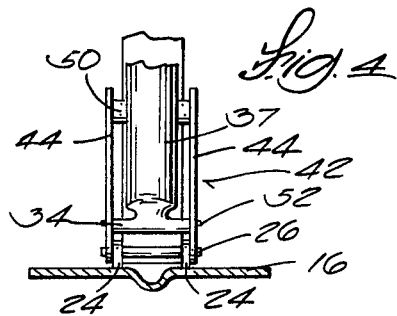
Fig. 4

SUSPENSION SYSTEM FOR A SNOWMOBILE

BACKGROUND OF THE INVENTION

The invention relates generally to a suspension system for a snowmobile and more particularly to a suspension system for a snowmobile which utilizes shock absorber means. A prior suspension system for a snowmobile utilizing a shock absorber is disclosed in the Hetteen U.S. Pat. No. 3,613,812 issued Oct. 19, 1971.

SUMMARY OF THE INVENTION

The invention disclosed herein provides a snowmobile suspension system with superior damping characteristics, which characteristics result from the use of a device which increases the stroke of shock absorber means used in the suspension system in response to a relative movement of the snowmobile body with respect to ski means disposed beneath the snowmobile body.

In accordance with an embodiment of the invention, there is provided a device for increasing the stroke of the shock absorber means used in a suspension system for a snowmobile body having a downwardly extending ski post, which suspension system includes a ski having clevis means disposed beneath the ski post, spring means secured to the ski post for biasing the snowmobile body against substantially downward movement, and shock absorber means having a lower end adapted for pivotal connection to the clevis means, and having an upper end secured to one of the ski post and the spring means. The device comprises bracket means adapted for connection to the spring means and having an arm adapted for connection to the lower end of the shock absorber means, which bracket means is also adapted for pivotal connection to the clevis means for pivoting the arm and displacing the lower end of the shock absorber means with respect to the upper end of the shock absorber means in response to a movement of the ski post with respect to the ski means.

Also in accordance with an embodiment of the invention, there is provided a suspension system for supporting a snowmobile body having a downwardly extending ski post, which suspension system comprises ski means disposed beneath the ski post, together with spring means secured to the ski post for biasing the snowmobile body against substantially downward movement. The suspension system includes shock absorber means having a lower end, and having an upper end secured to one of the ski post and the spring means, and also includes bracket means connected to the spring means and to the lower end of the shock absorber means, which bracket means is pivotally connected to the ski means for pivoting the lower end of the shock absorber means toward the upper end of the shock absorber means in response to a relative movement of the ski post towards the ski means.

Also in accordance with an embodiment of the invention, there is provided a suspension system wherein the spring means comprises a leaf spring, and wherein the bracket means comprises a bell crank member having a first arm slidably engaging the leaf spring, and having a second arm with an end portion secured to the lower end of the shock absorber means and also having a junction portion between the arms, which junction portion is pivotally connected to the ski means for pivoting the lower end of the shock absorber means.

Also in accordance with an embodiment of the invention, there is provided a suspension system for supporting a snowmobile wherein the leaf spring has a front portion and a rear portion secured to the ski means, and wherein the bracket means comprises a pair of bell crank members located on opposite sides of the leaf spring, and includes a clamp member secured to and between the first arms, which clamp member extends around and slidably engages the leaf spring, and also includes pin means secured between the end portions of the second arms for pivotally securing the lower end of the shock absorber means, and wherein the ski means includes clevis means having a pin for pivotally securing the junction portion of the bell crank member to the ski means and for securing the front portion of the leaf spring to the ski means.

Also in accordance with an embodiment of the invention, there is provided a snowmobile comprising a body having a pair of downwardly extending ski posts, each ski post having associated therewith a suspension system.

One of the principal features of the invention is the provision of a suspension system for a snowmobile which provides superior damping characteristics.

Another of the principal features of the invention is the provision of a device adapted for use with presently existing snowmobile suspension systems having shock absorber means, which device increases the stroke of the shock absorber means for providing the suspension system with superior damping characteristics.

Other features and advantages of the embodiments of the invention will become known by reference to the following drawings, general description and claims.

DRAWINGS

FIG. 1 is a perspective view of a snowmobile including a pair of suspension systems each embodying various of the features of the invention.

FIG. 2 is an enlarged persepective view of one of the suspension systems shown in FIG. 1.

FIG. 3 is a partial perspective view of a modified portion of the suspension system shown in FIG. 2 illustrating an alternative embodiment of the invention.

FIG. 4 is a front plan view taken along line 4—4 of FIG. 2.

Before explaining the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a snowmobile 10 including a body 11 having a pair of downwardly extending ski posts 12, which ski posts each have associated therewith a suspension system 14. Each suspension system 14 includes ski means such as a ski 16 disposed beneath one of the ski posts 12. Secured to the ski post 12 for biasing the snowmobile body 11 against substantially downward movement is spring means in the form of a leaf spring 18. More specifically, the leaf spring 18 includes a middle portion 28 which is fixedly secured to a clevis member 30, which clevis member 30 is pivotally secured to the ski post 12. The leaf spring 18 also preferably includes a front portion 20 and a rear portion 22 which are respectively secured to a front clevis member 24 and to a rear clevis member 25, which clevis members are secured to an upper surface of the ski 16.

In order to allow the leaf spring 18 to flex, the front portion 20 of the leaf spring 18 preferably comprises a relatively flat portion with a curved end. The flat portion is slidably engaged underneath a pin 26 inserted through apertures in the front clevis member 24. The rear end 22 of the leaf spring 18 can be secured in a smiliar manner by a pin 29 extending through apertures in the rear clevis member 25 as shown in FIG. 2.

The suspension system 14 includes shock absorber means or a shock abosorber 32 having a lower end 34 and an upper end 36 respectively connected to a cylindrical portion 37 and to a shaft 38. While various arrangements are possible, preferably the upper end 36 is secured to one of the ski post 12 and the leaf spring 18. As shown in FIG. 2, the upper end 36 can be pivotally secured to an extension 40, which extension 40 is fixedly secured to the ski post 12. An alternative embodiment is shwon in FIG. 3 where the extension 40' is fixedly secured to the clevis member 30', and therefore to the middle portion 28 of the leaf spring 18.

The suspension system 14 is provided with a device for increasing the stroke of the shock absorber means or shock absorber 32, which device comprises bracket means connected to the spring means and to lower end of the shock absorber means. The bracket means is also pivotally connected to the ski means for displacing the lower end of the shock absorber means toward the upper end of the shock absorber means in response to a relative movement of the ski post 12 toward the ski means.

While various arrangements are possible, the bracket means preferably comprises a bell crank member 42 having a first arm 44 adapted for slidably engaging the leaf spring 18, having a second arm 46 with an end portion 47 secured to the lower end 34 of the shock absorber 32, and also having a junction portion 48 between the arms, which junction portion 48 is pivotally secured to the ski 16.

More specifically, the bracket means preferably comprises a pair of bell crank members 42 located on opposite sides of the leaf spring 18 and includes clamp means in the form of a clamp member 50 secured to and between the first arms 44, which clamp member 50 extends around and slidably engages the leaf spring 18. Preferably, the pin 26 of the front clevis member 24 extends through apertures in the junction portions 48 to pivotally connect the bell crank members 42 to the ski 16. The bracket means also includes pin means or a pin 52 which can extend between and through apertures in the end portions 47 of the second arms 46 and through an extended aperture in the lower end 34 of the shock absorber 32 for pivotally securing the shock absorber to the bell crank member second arms.

During operation of the snowmobile, the weight of the snowmobile body 11 traversing across uneven terrain will cause the leaf spring 18 to flex, resulting in the snowmobile body bouncing upwardly and downwardly with respect to the ski 16. This relative movement of the ski 16, and the snowmobile body or ski post 12, will be dampened by the action of the shock absorber shaft 38 which is extended and compressed with respect to the shock absorber cylinder 37. The relative stroke, or extension and compression of the shock absorber shaft 38, and hence the damping effect, will be greater than in prior suspension systems since the lower end 34 of the shock absorber 32 is pivoted and displaced. More specifically, the first arms 44 of the bell crank member 42, which are slidably secured to the leaf spring 18, will pivot and follow the upward and downward movement of the flexing leaf spring 18. The second arms 46 of the bell crank members 42 will pivot about the pin 26 and thus the lower end of the shock absorber 34 will be displaced with respect to the upper end of the shock absorber providing an increased stroke and hence increased damping of the bouncing action of the snowmobile body.

The magnitude of the stroke of the shock absorber will depend on the size of the first arms of the bell crank members, and on the adjustment or position of the lower end of the shock absorber with respect to the end portions of the first arms. The amount of the increase in the stroke of a shock absorber used in a suspension system is also dependent on the size and shaft length of the particular shock absorber utilized. It is to be understood that the invention disclosed herein can be used with any presently existing suspension system having a shock absorber adapted for pivotal connection to clevis means and that the shock absorber could be mounted over the rear portion as well as the front portion of a leaf spring.

Various features of the invention are set forth in the following claims.

What is claimed is:

1. A device for increasing the stroke of shock absorber means used in a suspension system for a snowmobile body having a downwardly extending ski post, the suspension system including a ski having clevis means disposed beneath the ski post, spring means secured to the ski post for biasing the snowmobile body against substantially downward movement, and shock absorber means having a lower end adapted for pivotal connection to the clevis means, and having an upper end secured to one of the ski post and the spring means, said device comprising a bell crank member having a first arm adapted for slidably engaging the spring means, a second arm adapted for connection to the lower end of the shock absorber means, and a junction portion between said first and second arms, said junction portion being adapted for pivotal connection to the clevis means whereby to displace the lower end of the shock absorber means with respect to the upper end of the shock absorber means in response to a movement of the ski post with respect to the ski means.

2. A device in accordance with claim 1 wherein said bracket means comprises a pair of said bell crank members located on opposite sides of the spring means, and includes clamp means adapted for connection to and between said first arms, said clamp means being adapted for slidable engagement with the spring means.

3. A suspension system for supporting a snowmobile body having a downwardly extending ski post comprising ski means disposed beneath the ski post, an elongated spring secured to the ski post for biasing the snowmobile body against substantially downward movement, shock absorber means having a lower end, and having an upper end secured to one of the ski post and said spring and a bell crank member having a first arm slidably engaging said elongated spring, having a second arm with an end portion secured to said lower end of said absorber means, and also having a junction portion between said arms, said junction portion being pivotally connected to said ski means, whereby to displace said lower end of said shock absorber means toward said upper end of said shock absorber means in response to a relative movement of said ski post toward said ski means.

4. A suspension system in accordance with claim 3 wherein said spring comprises a leaf spring.

5. A suspension system in accordance with claim 4 wherein said bracket means comprises a pair of said bell crank members located on opposite sides of said leaf spring, and includes clamp means secured to and between said first arms, said clamp menas slidably engaging said leaf spring, and also includes pin means secured between said end portions of said second arms for pivotally securing said lower end of said shock absorber means, and wherein said ski means includes clevis means for pivotally securing said junction portions of said bell crank members to said ski means.

6. A suspension system in accordance with claim 5 wherein said clamp means comprises a clamp member which extends around said leaf spring.

7. A suspension system in accordance with claim 5 wherein said leaf spring includes a front portion and a rear portion, and wherein said clevis means includes a pin which pivotally secures said junction portions and which secures one of said leaf spring portions to said ski means.

8. A snowmobile comprising a body having a pair of downwardly extending ski posts, each ski post having associated therewith a suspension system including ski means disposed beneath said ski post, a leaf spring having a front portion and a rear portion secured to said ski means and having a middle portion secured to said ski post for biasing said body against substantially downward movement, shock absorber means having a lower end, and having an upper end secured to one of said ski post and said middle portion of said leaf spring, and bracket means comprising a bell crank member having a first arm slidably engaging said leaf spring, and having a second arm with an end portion secured to said lower end of said shock absorber means, and also having a junction portion between said arms, said junction portion being pivotally connected to said ski means for pivoting said second arm and displacing said lower end of said shock absorber means toward said upper end of said shock absorber means in response to a relative movement of said ski post toward said ski means.

9. A snowmobile in accordance with claim 8 wherein said bracket means comprises a pair of said bell crank members located on opposite sides of said leaf spring, and includes a clamp member secured to and between said first arms, said clamp member extending aroung and slidably engaging said leaf spring, and also includes pin means secured between said end portions of said second arms for pivotally securing said lower end of said shock absorber means, and wherein said ski means includes clevis means having a pin for pivotally securing said junction portions of said bell crank members to said ski menas and for securing said front portion of said leaf spring to said ski means.

* * * * *